(12) United States Patent
Gertsch et al.

(10) Patent No.: US 12,110,978 B2
(45) Date of Patent: Oct. 8, 2024

(54) METHODS AND SYSTEMS FOR ADJUSTING INDUSTRIAL GATE VALVE BOXES

(71) Applicant: Redco Construction, Cheyenne, WY (US)

(72) Inventors: Ryan Gertsch, Cheyenne, WY (US); M. J. Gertsch, Cheyenne, WY (US)

(73) Assignee: Redco Construction, Cheyenne, WY (US)

( * ) Notice: Subject to any disclaimer, the term of this patent is extended or adjusted under 35 U.S.C. 154(b) by 0 days.

(21) Appl. No.: 18/519,787

(22) Filed: Nov. 27, 2023

(65) Prior Publication Data

US 2024/0175509 A1 May 30, 2024

Related U.S. Application Data

(60) Provisional application No. 63/428,106, filed on Nov. 27, 2022.

(51) Int. Cl.
| | |
|---|---|
| *F16K 27/12* | (2006.01) |
| *B25B 13/50* | (2006.01) |
| *B25B 13/54* | (2006.01) |
| *B25B 27/24* | (2006.01) |
| *B66F 19/00* | (2006.01) |
| *E02D 29/12* | (2006.01) |

(52) U.S. Cl.
CPC .......... *F16K 27/12* (2013.01); *B25B 13/5083* (2013.01); *B25B 13/54* (2013.01); *B25B 27/24* (2013.01); *B66F 19/005* (2013.01); *E02D 29/12* (2013.01)

(58) Field of Classification Search
CPC ....... B25B 27/026; B25B 27/04; B25B 27/06; B25B 27/064; B25B 27/24; B25B 13/48; B25B 13/481; B25B 13/06; B25B 13/5091; B25B 13/5083; B25B 13/54; B66F 19/00; B66F 19/005; B66F 2700/05; B66F 2700/052; B66F 2700/09; F16K 31/46; F16K 31/60; F16K 35/06
See application file for complete search history.

(56) References Cited

U.S. PATENT DOCUMENTS

| | | |
|---|---|---|
| 358,515 A | 3/1887 | Warner |
| 1,445,581 A | 2/1923 | Fullop |
| (Continued) | | |

FOREIGN PATENT DOCUMENTS

| | | |
|---|---|---|
| DE | 19828272 B4 | 7/2004 |
| DE | 202009008761 U1 | 10/2009 |
| (Continued) | | |

OTHER PUBLICATIONS

German Patent No. DE19828272, published Jul. 15, 2004. Google translation, 7 pages.

(Continued)

*Primary Examiner* — Tyrone V Hall, Jr.
(74) *Attorney, Agent, or Firm* — Santangelo Law Offices, P.C.

(57) ABSTRACT

Embodiments of the application can provide methods and systems for the adjustment of gate valve boxes using custom fit gate valve box adjusters and the like. A gate valve box adjuster may include an alignment portion, an engagement key, a base plate, angle plates, and perhaps even an extension bar which may be attached to a motor and equipment.

19 Claims, 5 Drawing Sheets

(56) References Cited

U.S. PATENT DOCUMENTS

| | | | | |
|---|---|---|---|---|
| 2,059,085 | A | * 10/1936 | Buck | F16K 35/10 |
| | | | | 137/364 |
| 2,860,535 | A | * 11/1958 | Fowler | F16B 43/001 |
| | | | | 29/280 |
| 3,385,011 | A | 5/1968 | Sorrell | |
| 4,305,315 | A | * 12/1981 | Neppel | B25B 27/24 |
| | | | | 81/166 |
| 5,306,062 | A | 4/1994 | Dodge | |
| 5,527,078 | A | 6/1996 | Messick | |
| 5,810,051 | A | 9/1998 | Campagna et al. | |
| 6,098,261 | A | * 8/2000 | Goguen | F16C 19/548 |
| | | | | 29/280 |
| 6,125,868 | A | 10/2000 | Murphy et al. | |
| 6,776,068 | B2 | * 8/2004 | Reuschel | B25B 21/00 |
| | | | | 81/57.32 |
| 6,988,714 | B2 | 1/2006 | O'Neill | |
| 9,879,812 | B2 | 1/2018 | Roell | |
| 10,974,940 | B1 | 4/2021 | Siegenthaler | |
| 11,486,510 | B2 | 11/2022 | Backlund | |
| 2009/0134371 | A1 | 5/2009 | Pawelk | |
| 2009/0230706 | A1 | * 9/2009 | Maffeis | B25B 13/5083 |
| | | | | 294/96 |
| 2010/0117389 | A1 | 5/2010 | Poole | |
| 2014/0310934 | A1 | * 10/2014 | Olkowski, Jr. | B25B 13/5083 |
| | | | | 29/426.1 |
| 2015/0143964 | A1 | * 5/2015 | Kanczewski | B25B 13/54 |
| | | | | 81/436 |
| 2017/0268686 | A1 | * 9/2017 | Backlund | F16K 31/607 |

FOREIGN PATENT DOCUMENTS

| | | |
|---|---|---|
| DE | 202017107893 U1 | 1/2018 |
| KR | 102132849 B1 | 7/2020 |
| KR | 102411621 B1 | 6/2022 |
| SE | 502867 C2 | 2/1996 |

OTHER PUBLICATIONS

German Patent No. DE202009008761, published Oct. 29, 2009. Google translation, 5 pages.
German Patent No. DE202017107893, published Jan. 2, 2018. Google translation, 9 pages.
Korean Patent No. KR102132849, published Jul. 10, 2020. Google translation, 5 pages.
Korean Patent No. KR102411621, published Jun. 20, 2022. Google translation, 4 pages.
Swedish Patent No. 502867C2, published Feb. 5, 1996. Google translation, 3 pages.
Tyler Union, 30U—Non-Domestic, Standard Duty Valve and Service, Boxes and Components, Revised Nov. 2016. 1 page.
Valve Boxes, Covers and Risers https://www.ejco.com/am/en/products/valve-boxes-covers-risers-water-distribution?uom=&pagesize=48&pagenum=1&langcode=en_us&productregio . . . 3/. Retrieved Sep. 26, 2023. 8 pages.
Irrigation valve box puller—Golf Course Industry. https://www.golfcourseindustry.com/product/irrigation-valve-box-puller-27109/. Retrieved Sep. 26, 2023. 4 pages.
Valve Box Top Lifter. https://www.newconcepttools.com/product/valve-box-top-lifter. Retrieved Sep. 26, 2023. 3 pages.
Valve Boxes and Curb Boxes Selection Guide: Types, Features, Applications | GlobalSpec. Retrieved Sep. 26, 2023. 2 pages.
Castings, Inc., Cast Iron Valve Box VB SCRWE Type C.I. Dated May 31, 2013. 1 page.
U.S. Appl. No. 63/428,106, filed Nov. 27, 2022. First named inventor: Gertsch.

* cited by examiner

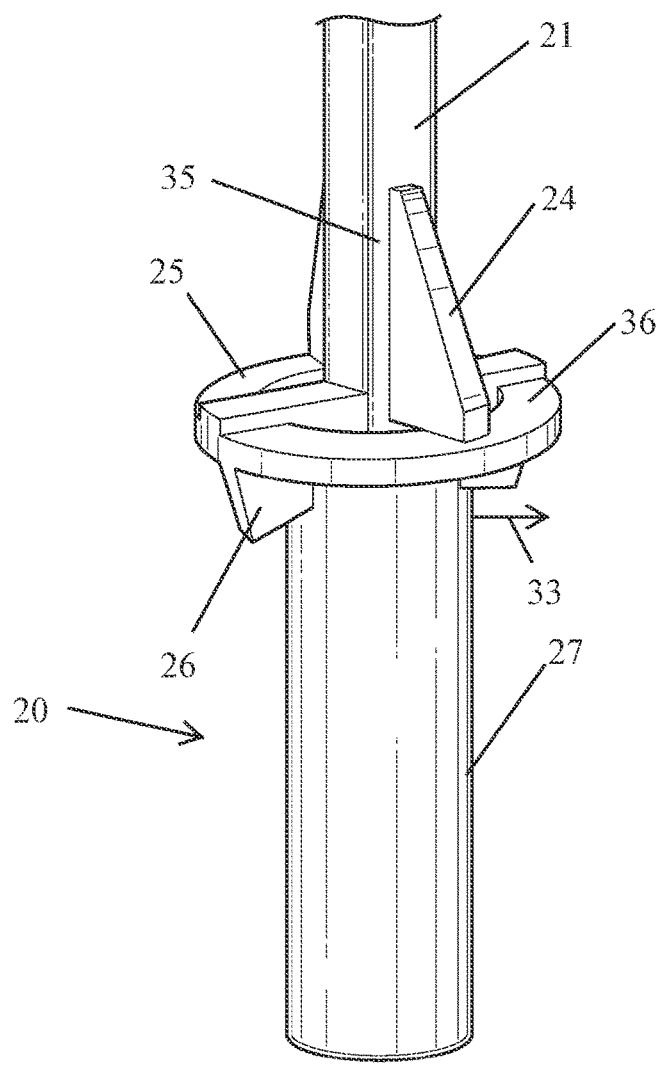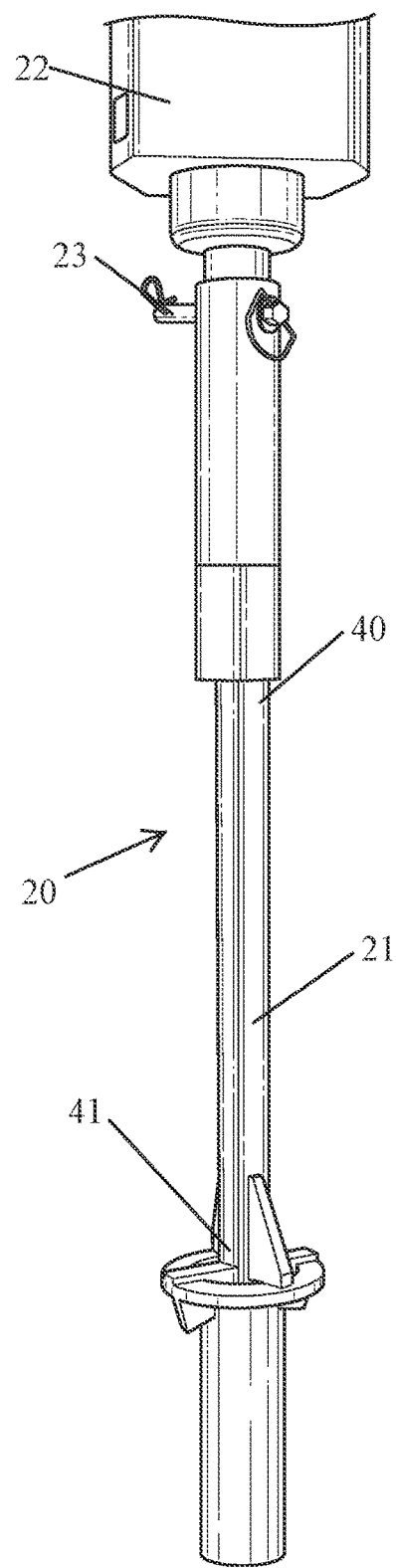
FIG. 3
FIG. 4

METHODS AND SYSTEMS FOR ADJUSTING INDUSTRIAL GATE VALVE BOXES

This is a US Nonprovisional patent application claiming priority to and the benefit of U.S. Provisional patent application No. 63/428,106, filed Nov. 27, 2022, hereby incorporated by reference herein in its entirety.

FIELD OF THE INVENTION

Generally, embodiments of this application can relate to systems and techniques to assist in gate valve box adjustments, perhaps in water main field development, maintenance, and even agricultural/industrial activities. Specifically, embodiments may focus on techniques and devices to efficiently raise and even lower gate valve box adaptors in water site development, utility maintenance, agricultural applications, and even industrial applications perhaps by focusing on reducing man hours and costs.

BACKGROUND OF THE INVENTION

Gate valve boxes may be used with gate valve system lines such as pipe lines, water mains, and the like. Gate valves can be used to open and close pipes, mains, and the like. Manually raising or even lowering gate valve boxes can be labor intensive and difficult. First, the box must be located, then adjustments are determined (e.g., the depth needed to meet proposed grade or dial down to pave over), then the metal threads can be unscrewed, and the like. Utility companies and contractors constantly struggle with gate valve boxes during new construction, routine maintenance, and even emergency maintenance. Once repairs may be done, the pipe thread may need to be realigned at a proper depth perhaps to connect above the underground water main valves, and then the pads surrounding the gate box valve may need to be repoured with concrete to complete the work. Some of the most significant problems that utility contractors and municipalities face may include rusting and corrosion of the threading on the cast metal pipes and even adjusting gate valve boxes to a proper depth of the buried ring. This can make repairs and installation difficult and time consuming. As such, there is a need to address the problems of adjusting gate valve boxes, including ring connection(s), corrosion issues, and the like.

SUMMARY OF THE INVENTION

This application includes a variety of aspects which may be selected in different combinations and lengths, based upon the application or need to be addressed. In one basic form, embodiments may include the use of a fabricated custom fit attachment which can be developed at varying lengths to line up and even unscrew gate valve box rings perhaps for in site utility development and repair application connection to the water systems of the municipality.

It is therefore an object to provide a system that can achieve rapid removal of rusted and/or cross threaded gate valve box rings with connectors in accordance with some embodiments.

It is another object to provide easy threading of rings to water systems at the appropriate depth and even with the appropriate rethreading which can reducing time and labor costs associated with these historically manual tasks in accordance with some embodiments.

It is yet another object to avoid manual labor of having to turn threads with hand tools perhaps to achieve the desired grade for gate box valves in accordance with some embodiments.

It is another object to provide utility and paving contractors the ability to make rapid adjustments to gate valve box elevations perhaps based on which phase or even scope of utility installation they are working on in accordance with some embodiments.

It is yet another object to provide a system which can be easy to use and can be readily adaptable to any tractor, compact skid, loader, track skid loader, excavators, or the like in accordance with some embodiments.

It is an object to provide a device that can be easily removed and stored in accordance with some embodiments.

It is yet another object to allow for additional devices perhaps in multiple product applications to reduce the manual labor perhaps required in routine agricultural applications in accordance with some embodiments.

Naturally, further objects, goals and embodiments of the application are disclosed throughout other areas of the specification, claims, and drawings.

BRIEF DESCRIPTION OF THE DRAWINGS

FIG. 3 shows a non-limiting example of an industrial gate valve box adjuster in accordance with some embodiments.

FIG. 4 shows a non-limiting example of an industrial gate valve box adjuster attached to a motor in accordance with some embodiments.

DETAILED DESCRIPTION OF THE PREFERRED EMBODIMENTS

Figure 1:
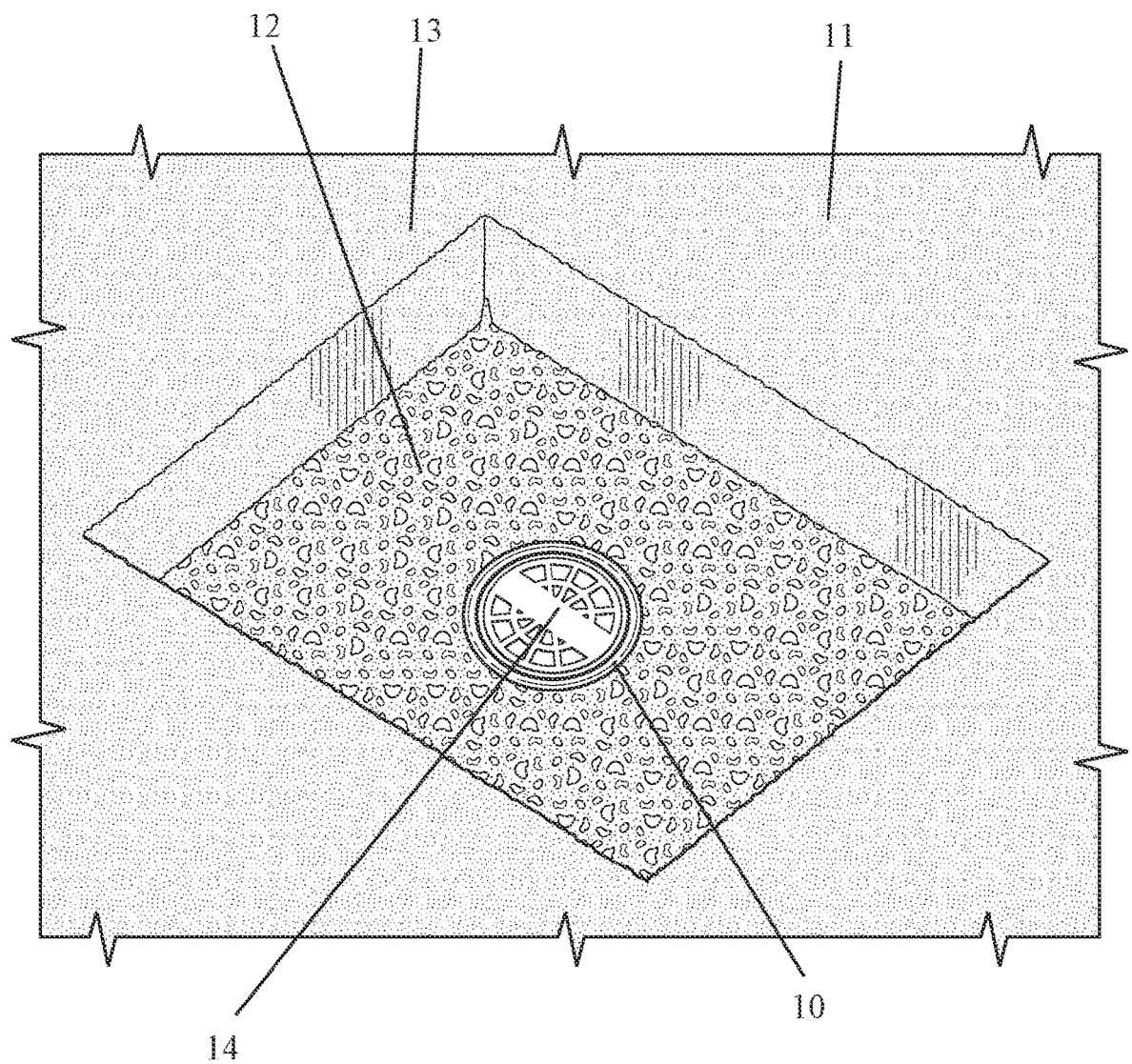
FIG. 1 shows a non-limiting example of an exposed installed gate valve box in accordance with some embodiments.

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the application may include an industrial gate valve adjustment system which can readily align, unthread, rethread, and the like gate valve box connections associated with construction, utility, agricultural, sewer, water development and repairs. In the past, this may have been achieved manually using several ordinary tools which can be dangerous and can require multiple people. In embodiments, an industrial gate valve box adjuster may assist in adjusting the top screw sections of a gate valve box assembly and can allow for the correct engagement and support for appropriate connections to unthread and even rethread the gate valve box. An adjuster may be attached to equipment such as a tractor or skid loader and can utilize hydraulic power to raise, lower, and rotate the gate valve box. This can greatly reduce the manpower and hours necessary to complete such utility development and/or repairs.

Some embodiments may provide an industrial gate valve box adjuster comprising an extension bar configured to connected to power; an attachment configured to attach to said extension bar to said power, wherein said attachment is located near an end of said extension bar; a valve guide alignment attached to an opposite end of said extension bar; a plate having at least one engagement key connected between said extension bar and said valve guide alignment, wherein said plate extends beyond a largest diameter of said valve guide alignment; at least one solid support configured to support said extension bar and said plate having said at least one engagement key, wherein said solid support is connected to a side of said extension bar and part of a top of said plate; wherein said valve guide alignment is configured to be lowered into an installed open gate valve box and configured to align said industrial gate valve box adjuster into said open gate valve box; when said industrial gate valve box adjuster is fully lowered into said installed open gate valve box, said at least one engagement key is configured to engage with an engagement notch of said installed open gate valve box; when said industrial gate valve box adjuster is fully lowered into said installed open gate valve box, said plate is configured to rest on a top ring of said installed open gate valve box; and perhaps even when said industrial gate valve box adjuster is engaged with said open gate valve box, said industrial gate valve box adjuster is configured to raise or lower said installed open gate valve box.

In other embodiments, a method may provide adjusting an installed gate valve box comprising the steps of locating an installed gate valve box; removing a cover from said installed gate valve box to establish an open gate valve box; attaching a gate valve box adjuster to power with an attachment; lowering said gate valve box adjuster into said open gate valve box; aligning said gate valve box adjuster into said open gate valve box with a valve guide alignment attached to extension bar of said gate valve box adjuster; providing a plate having at least one engagement key connected between said extension bar and said valve guide alignment, wherein said plate extends beyond a largest diameter of said valve guide alignment; supporting said extension bar and said plate having said at least one engagement key with at least one solid support connected to a side of said extension bar and part of a top of said plate; lowering said gate valve box adjuster into said open gate valve box; engaging said at least one engagement key with an engagement notch of said open gate valve box; resting said plate on a top ring of said open gate valve box; and perhaps even raising or lowering said installed open gate valve box with said gate valve box adjuster.

Figure 2:
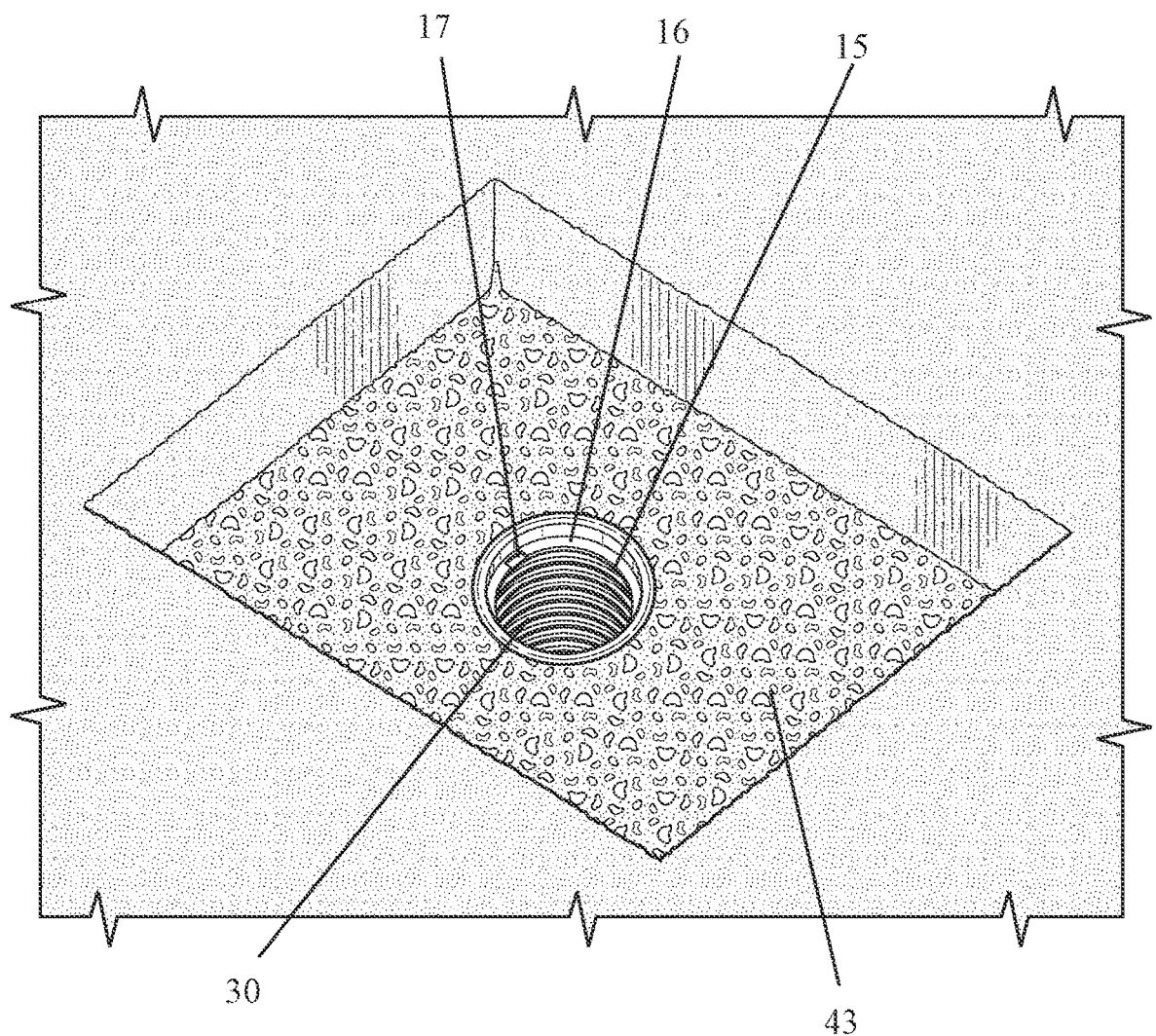
FIG. 2 shows a non-limiting example of a gate valve box with the cover off in accordance with some embodiments.

As may be understood from FIGS. 1 and 2, a gate valve box (10) may be installed in and located in the ground (43) and can be covered by paving (11). In some embodiments, a gate valve box (10) may be located below grade level (12) and may need to be lowered or even raised to a new location (13). When an installed gate valve box needs to be adjusted or maintained, the gate valve box may be exposed and the cover (14) may be removed to create an installed open gate valve box (15). An installed open gate valve box (15) may have a top ring (16), engagement notches (17) and even threads (30) as shown in FIG. 2.

Once a gate valve box is exposed and the cover has been removed, an industrial gate valve box adjuster (20) may be utilized to adjust the gate valve box. As shown in FIGS. 3 and 4, an industrial gate valve box adjuster (20) may include an extension bar (21) which can be connected to or even attached to power (22). It may also include an attachment (23) configured to attach the extension bar (21) to power (22). An attachment may be located near an end (40) of an extension bar or can be located any place along an extension bar. An adjuster may have a valve guide alignment (27) perhaps attached to an opposite end (41) (from an attachment end) of an extension bar (21). A plate (25) perhaps with at least one engagement key (26) may be connected between the extension bar (21) and a valve guide alignment (27). A plate may extend beyond (33) a largest diameter of a valve guide alignment perhaps so that when an adjuster is engaged with an open gate valve box, it may rest on top of the open gate valve box. At least one solid support (24) may be connected to a side (35) of an extension bar and connected to part of a top (36) of a plate. A solid support (24) may be configured to support the extension bar and the plate.

Figure 5:
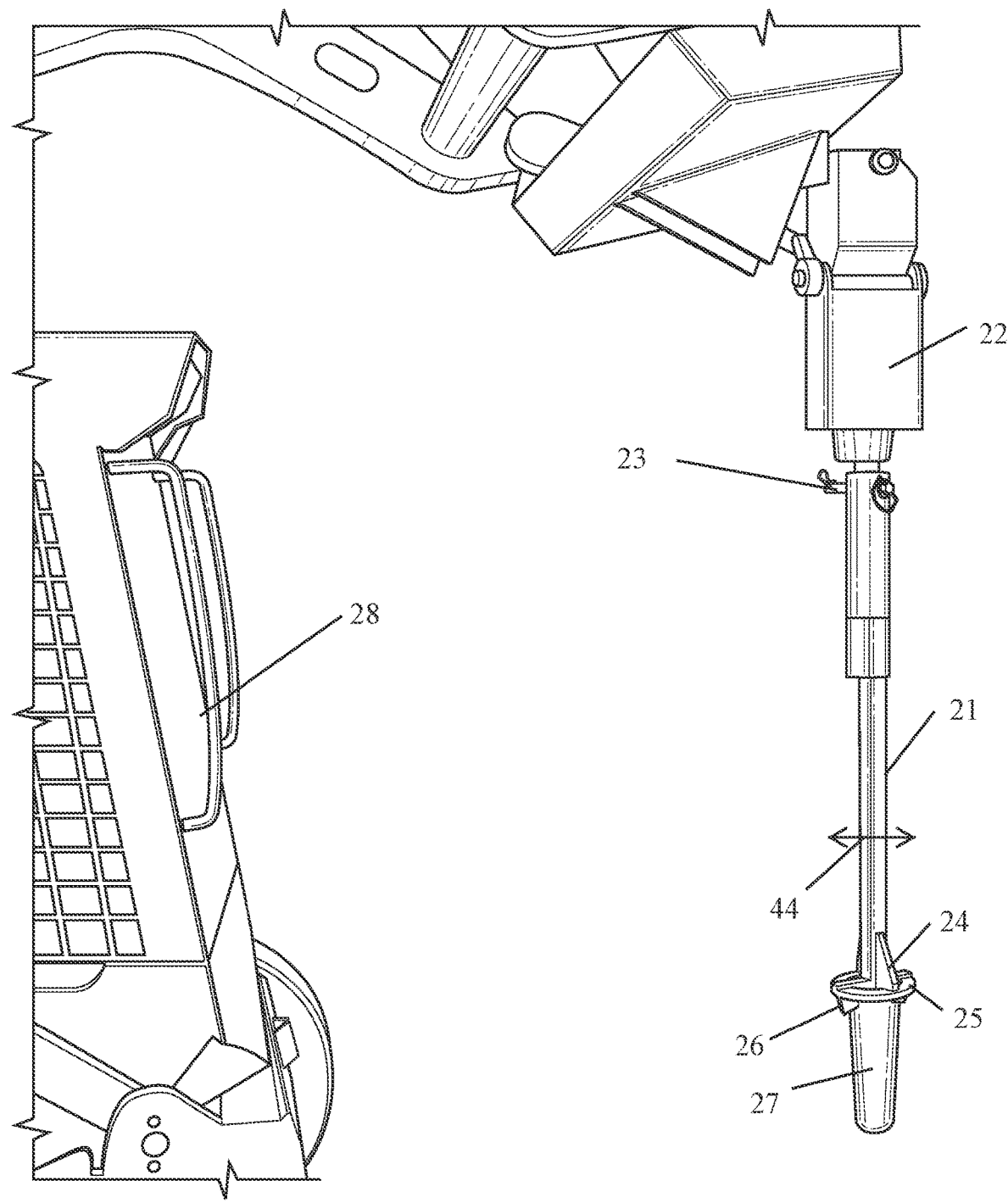
FIG. 5 shows a non-limiting example of an industrial gate valve box adjuster attached to a motor and equipment in accordance with some embodiments.
Figure 6:
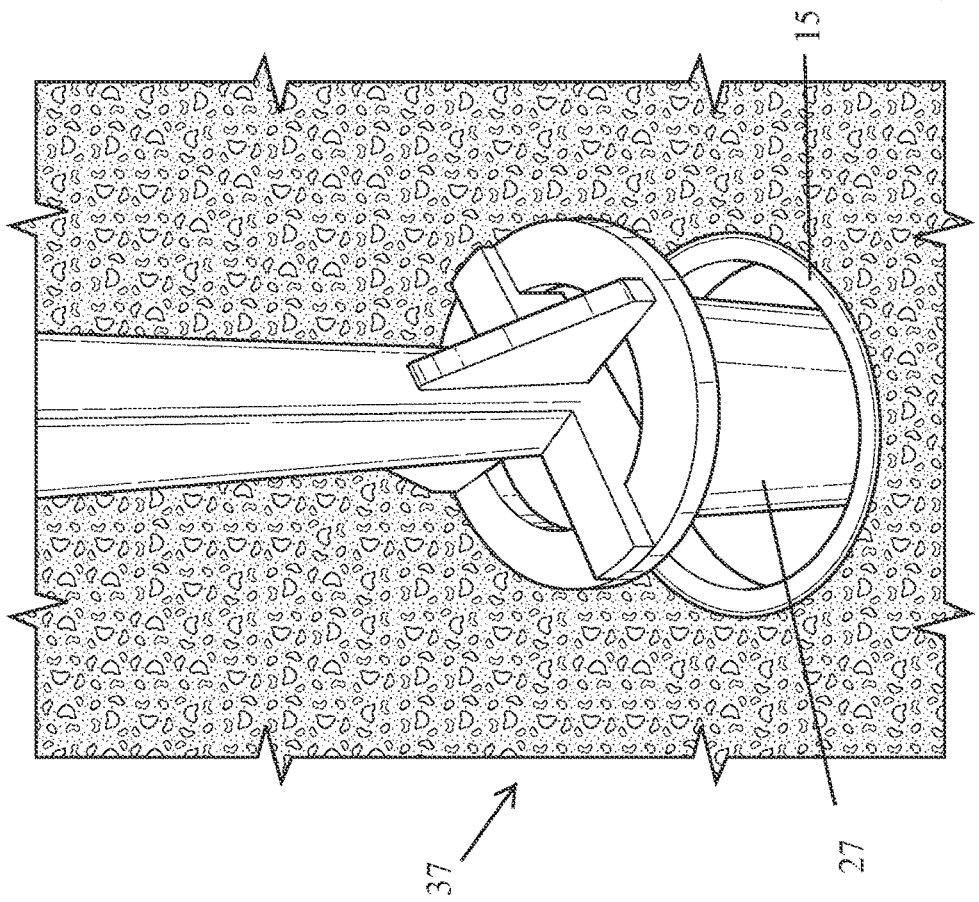
FIG. 6 shows a non-limiting example of an industrial gate valve box adjuster being lowered into an open gate valve box in accordance with some embodiments.

A valve guide alignment (27) may be configured to be lowered (37) into an open installed gate valve box (15) and may be configured to align the industrial gate valve box adjuster into the open gate valve box as may be understood from FIG. 6. A valve guide alignment (27) may help align the adjuster perhaps as equipment (28) attached to the adjuster machine lowers and even moves the adjuster into position to make the adjustments. A valve guide alignment (27) may be a hollow steel tube and may be any shape such as a cylinder shape (as shown in FIGS. 3 and 4), a tapered cone shape (as shown in FIG. 5), a straight shape, a non-tapered shape, or the like.

Figure 7:
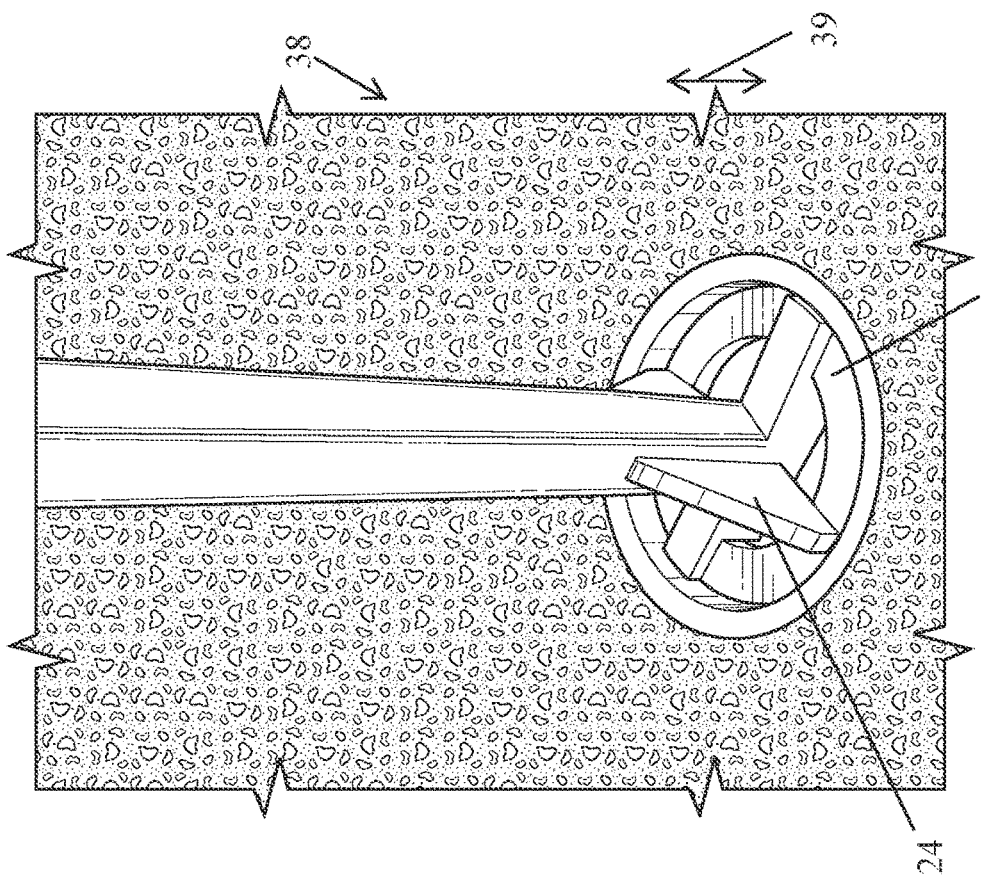
FIG. 7 shows a non-limiting example of an industrial gate valve box adjuster engaged with a gate valve box in accordance with some embodiments.

Once the industrial gate valve box adjuster is fully lowered into the installed open gate valve box (15), at least one engagement key (26) may be configured to engage with an engagement notch (17) of the installed open gate valve box (15) and a plate (25) may be configured to rest on a top ring (16) of the installed open gate valve box. The industrial gate valve box adjuster can be engaged (38) with the open gate valve box as shown in FIG. 7 and as engaged can raise or even lower (39) the installed open gate valve box.

In embodiments, an extension bar (21) may be a solid hexagon extension bar or shaft and may be of any length. An engagement key (26) may be located on a side of an adjuster and may engage with the notches in the gate valve box inner housing. An engagement key (26) may be a tapered solid bar or the like which is configured to fit with the gate valve box notches. If more than one engagement keys may be used, such as at least two engagement keys, they may be located at the appropriate distances on the side of an adjuster to engage correctly with the gate valve box notches. A plate (25) may be a base plate which may provide reinforcement to transfer torque from an extension bar to an engagement key. A plate (25) may be a circular plate. A plate may sit near a top of a pipe or may even rest on an inner lip of the valve box perhaps to help support the implement while it is being used.

A solid support (24) may be an angled solid support which can help engage the torque of the extension bar perhaps while a hydraulic unit may be turned clockwise or counter-clockwise depending on the desired height of the gate box valve. Two or more solid supports, such as at least two solid supports, may be utilized in an adjuster and may be located on the sides of an extension bar. Part of or even all of an industrial gate valve box adjuster may be made of steel, iron, or other strong materials and may be a single unit or in multiple parts.

As mentioned herein, a valve guide alignment (27) may be attached to power (22) which may itself be attached to an equipment (28) such as but not limited to skid steer, tractor, compact skid, loader, skid steer loader, track skid loader, excavator, or the like. Power may be a hydraulic drive, an engine, motor, an auger drive, a skid steer auger drive, or the like. In some embodiments, systems may provide hydraulic pressure through an adjuster. An attachment (23) used to attach an extension bar (21) to power (22) may include but is not limited to a pin, bolt, connector, or the like. Boom arms of equipment may be raised by the operator, bucket tilt functions may even be engaged, and even rotation (44) of the adjuster may be utilized as shown in FIG. 5. This can hang the industrial gate valve box adjuster perhaps vertically and can allow an operator to guide it toward a gate valve box and engage with the open gate valve box. Here, the installed open gate valve box can be lowered or even raised, threaded or even unthreaded, rotated clockwise or even counterclockwise, or the like. Threading may dial down for pavement application or unthreading may raise up to finish grade to allow for collar installation or the like. After the necessary adjustments have been made, the adjuster may be picked up vertically perhaps to pull out of the gate box valve and be removed, the gate valve box may be covered with its cover and in some embodiments, concrete may be poured around the closed gate box valve. The extension bar (21) may be unattached from the power and/or equipment and the adjuster may be loaded, perhaps by hand, into storage or transported.

As can be easily understood from the foregoing, the basic concepts of the various embodiments of the present invention(s) may be embodied in a variety of ways. It involves both gate valve box adjustment techniques as well as devices to accomplish the appropriate gate valve box adjustment. In this application, the gate valve box adjustment techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified). In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention(s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "engagement" should be understood to encompass disclosure of the act of "engaging"—whether explicitly discussed or not—and, conversely, were there effectively disclosure of the act of "engaging", such a disclosure should be understood to encompass disclosure of a "engagement" and even a "means for engaging." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components, programming, subroutines, logic, or elements that are configured to, or configured and arranged to, provide or even achieve a particular result, use, purpose, situation, function, or operation, or as components that are capable of achieving a particular activity, result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any information statement filed with the application are hereby appended and hereby incorporated by reference, however, as to each of the above, to the extent that such information or statements incorporated by reference might be considered inconsistent with the patenting of the various embodiments of invention(s) such statements are expressly not to be considered as made by the applicant(s).

Thus, the applicant(s) should be understood to have support to claim and make claims to embodiments including at least: i) each of the gate valve box adjustment devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrases "comprising", "including", "containing", "characterized by" and "having" are used to maintain the "open-end" claims herein, according to traditional claim interpretation including that discussed in MPEP § 2111.03. Thus, unless the context requires otherwise, it should be understood that the terms "comprise" or variations such as "comprises" or "comprising", "include" or variations such as "includes" or "including", "contain" or variations such as "contains" and "containing", "characterized by" or variations such as "characterizing by", "have" or variations such as "has" or "having", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 9 or any other claim" or the like, it could be re-drafted as dependent on claim 1, claim 8, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An industrial gate valve box system comprising:
    an installed open gate valve box comprising an engagement notch and a top ring;
    an industrial gate valve box adjuster comprising:
    an extension bar configured to connect to a power source;
    an attachment for attaching said extension bar to said power source, wherein said attachment is located near a first end of said extension bar;
    a valve guide alignment attached to a second end opposite said first end of said extension bar, said valve guide alignment having a diameter;
    a plate having at least one engagement key connected between said extension bar and said valve guide alignment, wherein said plate extends beyond said diameter of said valve guide alignment;
    at least one solid support configured to support said extension bar and said plate, wherein said solid support is connected to a side of said extension bar and a topside of said plate;
    wherein said valve guide alignment of said industrial gate valve box adjuster is lowered into said installed open gate valve box and configured to align said industrial gate valve box adjuster into said installed open gate valve box;
    when said industrial gate valve box adjuster is fully lowered into said installed open gate valve box, said at least one engagement key of said industrial gate valve box adjuster is configured to engage with said engagement notch of said installed open gate valve box and said plate is configured to rest on a said top ring of said installed open gate valve box; and
    with said industrial gate valve box adjuster engaged with said installed open gate valve box said industrial gate valve box adjuster is configured to raise or lower said installed open gate valve box.

2. The industrial gate valve box system of claim 1 wherein said extension bar comprises a solid hexagon extension bar.

3. The industrial gate valve box system of claim 1 wherein said at least one engagement key comprises a tapered solid bar.

4. The industrial gate valve box system of claim 1 wherein said at least one solid support comprises an angled solid support.

5. The industrial gate valve box system of claim 1 wherein said valve guide alignment comprises a hollow steel tube.

6. The industrial gate valve box system of claim 1 wherein said valve guide alignment comprises a shape, wherein the shape is a cylinder shape or a tapered cone shape.

7. The industrial gate valve box system of claim 1 wherein said installed open gate valve box comprises a gate valve box located in a ground.

8. The industrial gate valve box system of claim 1 wherein said industrial gate valve box adjuster is made of steel.

9. The industrial gate valve box system of claim 1 wherein said power source is skid steer, tractor, compact skid, loader, skid steer loader, track skid loader or excavator.

10. The industrial gate valve box system of claim 1 wherein said industrial gate valve box adjuster is configured to raise or lower said installed open gate valve box by rotating said industrial gate valve box adjuster clockwise or counterclockwise to thread or unthread said installed open gate valve box.

11. The industrial gate valve box system of claim 1 wherein said extension bar, said valve guide alignment, said plate, said at least one engagement key, and said least one solid support are integral.

12. The industrial gate valve box system of claim 1 wherein said attachment is a pin, bolt or connector.

13. The industrial gate valve box system of claim 1 wherein said extension bar is configured to be rotated and wherein said plate is configured to transfer torque from said rotating extension bar to said at least one engagement key.

14. The industrial gate valve box system of claim 12 wherein said at least one solid support is configured to transfer torque from said rotating extension bar to said at least one engagement key.

15. The industrial gate valve box system of claim 1 wherein said at least one engagement key comprises at least two engagement keys and wherein said at least one solid support comprises at least two solid supports.

16. The industrial gate valve box system of claim 1 wherein said plate comprises a circular plate.

17. A method for adjusting an installed gate valve box comprising the steps of:
   locating an installed gate valve box;
   removing a cover from said installed gate valve box to establish an open gate valve box;
   providing an industrial gate valve box adjuster comprising:
   an extension bar configured to connect to a power source;
   an attachment for attaching said extension bar to said power source, wherein said attachment is located near a first end of said extension bar;
   a valve guide alignment attached to a second end opposite said first end of said extension bar, said valve guide alignment having a diameter;
   a plate having at least one engagement key connected between said extension bar and said valve guide alignment, wherein said plate extends beyond said diameter of said valve guide alignment;
   at least one solid support configured to support said extension bar and said plate, wherein said solid support is connected to a side of said extension bar and a topside of said plate;
   attaching said industrial gate valve box adjuster to said power source via said attachment;
   lowering said industrial gate valve box adjuster into said open gate valve box;
   aligning said industrial gate valve box adjuster into said open gate valve box with said valve guide alignment attached to said extension bar of said industrial gate valve box adjuster;
   engaging said at least one engagement key with an engagement notch of said open gate valve box;
   resting said plate on a top ring of said open gate valve box; and
   raising or lowering said installed open gate valve box with said gate valve box adjuster.

18. The method as described in claim 17 wherein said step of raising or lowering said installed open gate valve box with said gate valve box adjuster comprises a step of rotating the industrial gate valve box adjuster clockwise or counterclockwise to thread or unthread said open gate valve box.

19. The industrial gate valve box adjuster as described in claim 1 wherein said power source is a hydraulic drive, hydraulic pressure, an engine, motor, an auger drive, or a skid steer auger drive.

* * * * *